(12) United States Patent
Dyer et al.

(10) Patent No.: US 9,639,872 B2
(45) Date of Patent: May 2, 2017

(54) SYSTEM AND METHOD FOR MANAGING PRICING AND INVENTORY INFORMATION

(75) Inventors: Maxwell Kincaid Dyer, Lenoir, NC (US); Daren Christopher Wilz, Lenoir, NC (US)

(73) Assignee: La-Z-Boy Incorporated, Monroe, MI (US)

(*) Notice: Subject to any disclaimer, the term of this patent is extended or adjusted under 35 U.S.C. 154(b) by 1683 days.

(21) Appl. No.: 12/579,624

(22) Filed: Oct. 15, 2009

(65) Prior Publication Data

US 2010/0096453 A1     Apr. 22, 2010

Related U.S. Application Data

(60) Provisional application No. 61/106,201, filed on Oct. 17, 2008.

(51) Int. Cl.
*G06K 15/00* (2006.01)
*G06Q 30/06* (2012.01)

(52) U.S. Cl.
CPC ................. *G06Q 30/0603* (2013.01)

(58) Field of Classification Search
USPC ................................. 235/383, 385
See application file for complete search history.

(56) References Cited

U.S. PATENT DOCUMENTS

| | | | |
|---|---|---|---|
| 7,899,710 B1* | 3/2011 | Walker et al. | 705/26.7 |
| 2002/0059204 A1* | 5/2002 | Harris | 707/3 |
| 2006/0282342 A1* | 12/2006 | Chapman | 705/28 |
| 2008/0262940 A1* | 10/2008 | Kovach | 705/26 |

* cited by examiner

*Primary Examiner* — Rafferty Kelly
(74) *Attorney, Agent, or Firm* — Harness, Dickey & Pierce, P.L.C.

(57) ABSTRACT

A sales management system may include a pricing data store operable to store a manufacturer price for a sales item; a retail input device adapted to receive a margin applicable to the sales item from a retailer and operable to store the margin; a retail display device residing at a retail location and configured to display a retail price for the sales item; and a product information provider located remotely from the retail display device and in communication with the manufacturer pricing data store, the product information provider configured to receive a request for product information from the retail display device and operable to compute the retail price for the sales item based in part on the manufacturer price for the sales item and the margin associated with the retailer and to provide the retail price to the retail display device for display in relation to the sales item.

22 Claims, 7 Drawing Sheets

SYSTEM AND METHOD FOR MANAGING PRICING AND INVENTORY INFORMATION

CROSS-REFERENCE TO RELATED APPLICATIONS

This application claims the benefit of U.S. Provisional Application No. 61/106,201, filed on Oct. 17, 2008. The entire disclosure of the above application is incorporated herein by reference.

FIELD

The present disclosure relates to a system and method for managing pricing and inventory information.

BACKGROUND

In many consumer product industries, manufacturers produce consumer goods to be sold in retail stores. For example, furniture manufacturers may produce furniture items and sell the furniture items to retailers and/or dealers at a manufacturer's price or a wholesale price. The retailers and/or dealers may then sell the furniture items to consumers in a retail furniture store or warehouse at an increased retail price. The retail price may include a margin which may cover operating costs, shipping and handling costs, overhead, other costs of doing business and provide a profit for the retailer.

Many furniture retailers offer a wider variety of furniture items than they may have in stock or on display in retail showrooms at a given time. Therefore, retailers often have furniture catalogs from which consumers may view and select one or more furniture items. However, as in many retail industries, furniture retailers often vary the retail prices of the furniture items that they sell to coincide with sales events, changing supply and demand, and other market forces. These market forces may also affect the furniture manufacturer's inventory. Accordingly, it is often difficult and impractical for a salesperson to obtain pricing, availability and other up-to-date product information while a customer waits in a retail showroom, which may result in unhappy customers and/or lost sales.

This section provides background information related to the present disclosure which is not necessarily prior art.

SUMMARY

This section provides a general summary of the disclosure, and is not a comprehensive disclosure of its full scope or all of its features.

In one form, the present disclosure provides a sales management system that may include a manufacturer pricing data store operable to store a manufacturer price for a sales item as provided by a manufacturer of the sales item; a retail input device adapted to receive a margin applicable to the sales item from a retailer and operable to store the margin in association with the retailer; a retail display device residing at a retail location and configured to display product information including a retail price for the sales item; and a product information provider embodied as computer executable instructions on a computer device located remotely from the retail display device and in data communication with the manufacturer pricing data store, the product information provider configured to receive a request for product information pertaining to the sales item from the retail display device and operable to compute the retail price for the sales item based in part on the manufacturer price for the sales item and the margin associated with the retailer and to provide the retail price to the retail display device for display in relation to the sales item.

In another form, the present disclosure provides a sales management system that may include a manufacturer pricing data store operable to store manufacturer prices for a plurality of sales items as provided by one or more manufacturers of the sales items; a retail input device including a web-based sales tool having a plurality of margin input fields, each of the plurality of margin input fields corresponding to at least one of the plurality of sales items; a retail display device residing at a retail location and configured to display product information including a retail price for each of the plurality of sales items; and a product information provider embodied as computer executable instructions on a computer device and in communication with the retail display device, the manufacturer pricing data store, and the retail input device. The product information provider may be configured to receive a request for product information pertaining to at least one of the plurality of sales items from the retail display device and operable to compute the retail price for the at least one of the plurality of sales items based in part on the manufacturer price for the at least one of the plurality of sales items and the margin associated with the retailer and to provide the retail price to the retail display device for display in relation to the at least one of the plurality of sales items.

In yet another form, the present disclosure provides a computer readable medium having computer executable commands for directing a computer to execute a method that may include selecting a product identifier associated with a sales item; retrieving a manufacturer price associated with the sales item; retrieving a margin associated with the sales item; determining a sales price associated with the sales item based on the manufacturer price and the margin; retrieving a current product availability status associated with the sales item; and generating a display associated with the sales item and including the sales price and the current product availability status.

Further areas of applicability will become apparent from the description provided herein. The description and specific examples in this summary are intended for purposes of illustration only and are not intended to limit the scope of the present disclosure.

DRAWINGS

Figure 1:
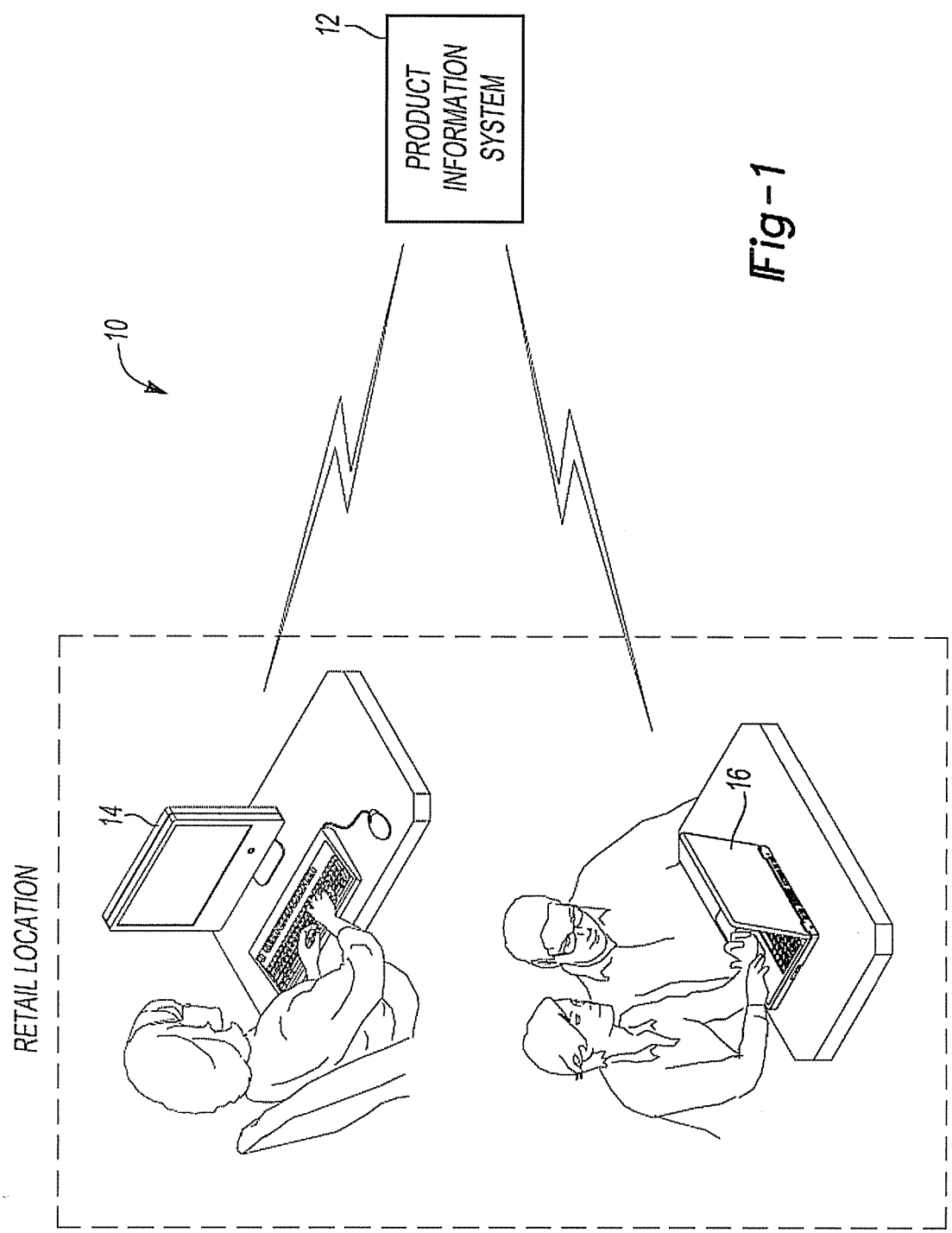
FIG. 1 is schematic representation of a sales information management system according to the principles of the present disclosure.

The drawings described herein are for illustrative purposes only of selected embodiments and not all possible implementations, and are not intended to limit the scope of the present disclosure. Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

With reference to FIGS. 1-9, a sales information management system is provided and is generally referred to as the system 10. The system 10 may provide product pricing, availability and/or other details about furniture items, for example, or any other retail or consumer product, and display such information at a retail store to sales personnel and/or consumers, for example. The system 10 may include a product information system 12, a retailer input device 14 and a retail floor display device 16. As shown in FIG. 1, the retailer input device 14 and the retail floor display device 16 can be located at a retail store or warehouse, for example, and may be in remote communication with the product information system 12 via an internet or extranet connection, for example. It will be appreciated that the product information system 12 may be in communication with a plurality of retailer input devices 14 and a plurality of retail floor display devices 16 corresponding to a plurality of retailers.

Figure 2:
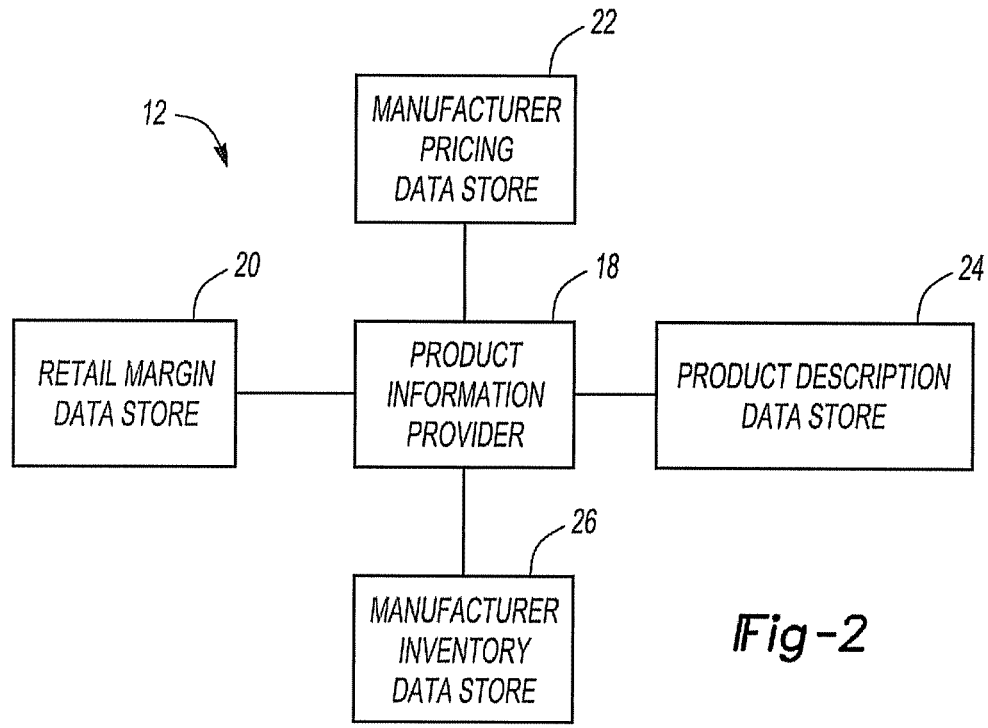
FIG. 2 is a block diagram of a product information system of the sales information management system of FIG. 1.

Referring now to FIG. 2, the product information system 12 may be managed by a furniture manufacturer, for example, or any other product manufacturer or contractor thereof. The product information system 12 may include a product information provider 18 in communication with a plurality of data stores including, a retail margin data store 20, a manufacturer pricing data store 22, a product description data store 24 and a manufacturer inventory data store 26. As used herein, the term "product information provider" may refer to, be part of, or include an Application Specific Integrated Circuit (ASIC), an electronic circuit, a processor (shared, dedicated or group) and/or memory (shared, dedicated or group) that execute one or more software or firmware programs, a combinational logic circuit and/or other suitable components that provide the described functionality.

The retail margin data store 20 may store information including a plurality of retailer identifiers and a plurality of retail margin values. Each of the plurality of retailer identifiers may correspond to one of a plurality of furniture retailers, for example. Each of the furniture retailers may input one or more retail margin values into the retail margin data store 20 via the retailer input device 14 (FIG. 1), as will be subsequently described. The retail margin values may be gross margin values expressed as a percentage, for example. It will be appreciated that the retail margin data store 20 could be located remotely from the retail location, proximate the product information provider 18, or alternatively, the retail margin data store 20 could be located in or proximate to the retailer input device 14.

The manufacturer pricing data store 22 may store information including a list of furniture items that the furniture manufacturer produces or will produce. The list of furniture items may include manufacturer prices corresponding to each of the furniture items. The manufacturer prices may be wholesale prices or the prices at which the manufacturer is willing to sell the furniture items to retailers, dealers and/or distributors. The manufacturer pricing data store 22 could also include information regarding any manufacturer discounts being offered by the manufacturer for one or more of the furniture items. Further, the manufacturer pricing data store 22 could include different manufacturer prices for a particular furniture item depending on the quantity of the particular furniture item that the furniture retailer orders. It is contemplated that other pertinent pricing information could be stored in the manufacturer pricing data store 22.

The product description data store 24 may store information including the list of furniture items, photographs and physical descriptions of the furniture items. Such physical descriptions may include physical dimensions, available materials, colors and finishes, descriptions of functional and/or aesthetic features of the furniture items, warranty information, and/or any other pertinent information that may be of interest to potential buyers and end-users.

The manufacturer inventory data store 26 may store information including the list of furniture items and an availability status of each of the furniture items. For example, the manufacturer inventory data store 26 may include one or more dates on which each of the furniture items will be available to be shipped from the manufacturer's factory or plant to the furniture retailer's store or warehouse. The manufacturer inventory data store 26 could also include a quantity of one or more of the furniture items that are available or will be available at a given time. Additionally or alternatively, the manufacturer inventory data store 26 could include a tracking number and/or other tracking information for the retailer to track a shipment of one or more furniture items being shipped from the manufacturer to the retailer or the consumer.

Figure 3:
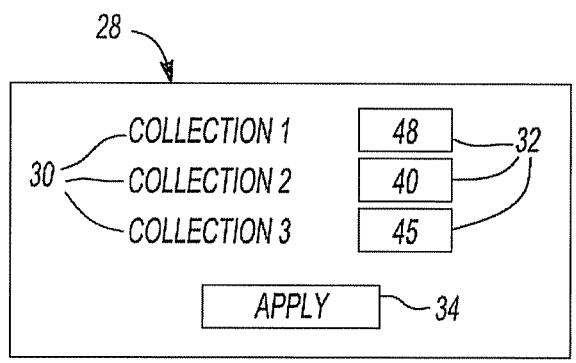
FIG. 3 is a schematic representation of a computer-based sales tool according to the principles of the present disclosure.

Referring now to FIGS. 1 and 3, the retailer input device 14 may be a personal computer located at a store or office of the furniture retailer or any other suitable location. As described above, the retailer input device 14 may communicate the margin values corresponding to each of the furniture items to the product information system 12. For example, an authorized manager, executive or owner of the furniture retailer may cause a web-based sales tool 28 to be displayed on the retailer input device 14 by entering a customized username and password corresponding to the retailer identifier of the furniture retailer. The sales tool 28 may include a list of the furniture manufacturer's furniture collections 30, a plurality of input fields 32 and an apply button 34. Each of the input fields 32 may correspond to one of the furniture collections 30, for example. The authorized manager may enter and/or update one or more of the margin values by typing the desired retail margin value (as a percentage) into the corresponding one or more input fields 32. The authorized manager may then select the apply button 34 to communicate the margin values to the product information system 12 to be stored in the retail margin data store 20 (FIG. 2). It will be appreciated that the retailer input device 14 could be an internet-enabled cellular phone or any other mobile communication device adapted to access the Internet. In this manner, the authorized manager, executive or owner of the furniture retailer could enter or modify margin values of any or all of the furniture collections 30 or furniture items 36 remotely without having to be physically present in the store or office.

Figure 4:
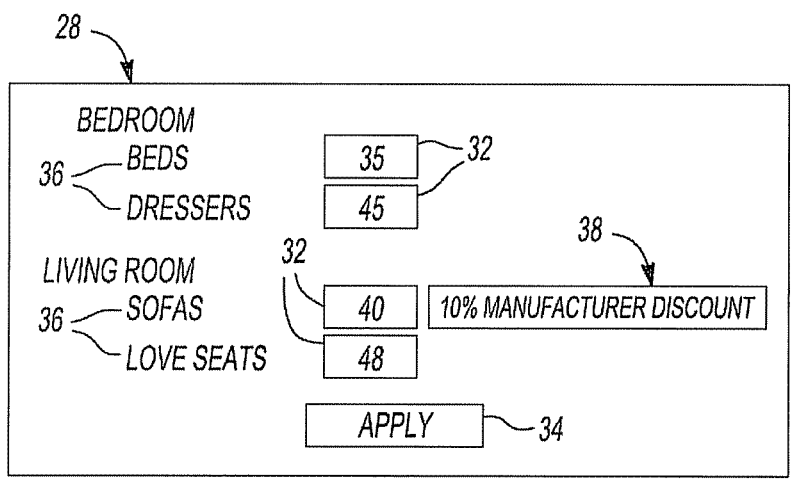
FIG. 4 is another schematic representation of a computer-based sales tool according to the principles of the present disclosure.

Additionally or alternatively, the sales tool 28 could include a list of furniture items 36 manufactured by the furniture manufacturer, as shown in FIG. 4. In this embodiment, the input fields 32 may correspond to each of the furniture items. In this manner, the authorized manager may type the desired margin value for a particular furniture item into the corresponding input field 32 and select the apply button 34 to communicate the margin values to the retail margin data store 20 (FIG. 2). It will also be appreciated that the retailer input device 14 and/or the sales tool 28 could be configured such that the authorized manager could enter a single margin value that could be applied to all of the furniture items produced by the manufacturer or sold by the retailer.

Additionally or alternatively, the sales tool 28 could include text 38, color coding, highlighting or other markings on or near one or more of the furniture collections 30, furniture items 36 and/or input fields 32 to indicate a manufacturer's discount on a particular collection, item or group of items. For example, FIG. 4 shows sofas having a 10% manufacturer's discount. Such information may be retrieved from the manufacturer pricing data store 22, for example, and communicated to the retailer input device 14 via the product information system 12. The authorized manager can then decide whether the furniture retailer will pass the manufacturer's discount along to the consumer or whether the margin will be increased to maintain the retail price that the consumer would get without the manufacturer's discount.

Referring now to FIGS. 1 and 5-8, the retail floor display device 16 may be a personal computer, a touch-screen display or any other interactive display device. The retail floor display device 16 may display a retail floor catalog 40 (FIGS. 5-8) which may be viewed by sales people and consumers inside of the furniture retailer's store(s). The retail floor catalog 40 may receive and display information communicated from the product information system 12, as will be subsequently described.

Figure 5:
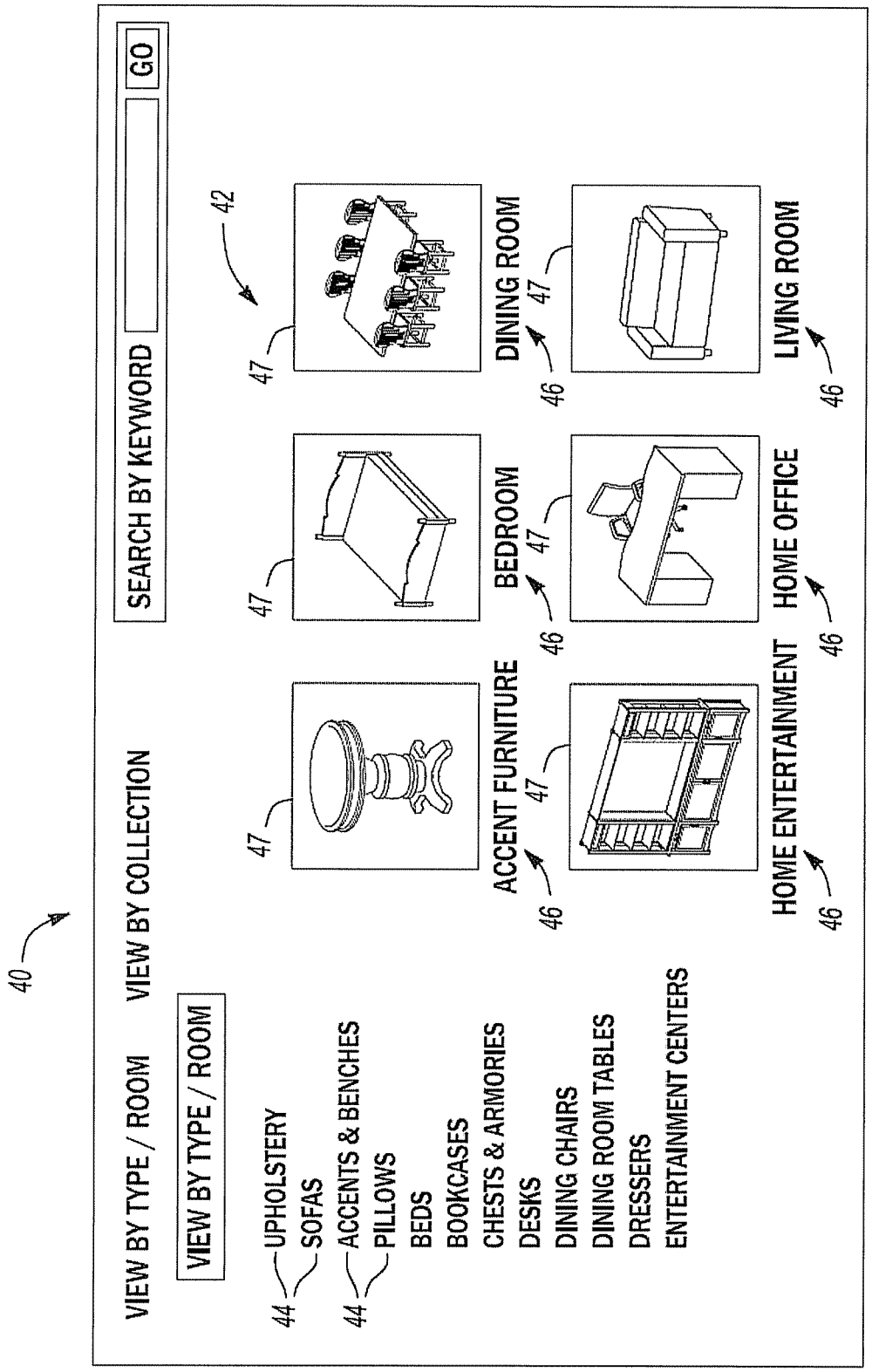
FIG. 5 is a schematic representation of a retail floor catalog having a furniture type/room type menu according to the principles of the present disclosure.

The retail floor catalog 40 may include a furniture type/room type menu 42 (FIG. 5). The furniture type/room type menu 42 may include a plurality of furniture type links 44 and a plurality of room type links 46, allowing sales people and consumers to search for furniture items by furniture type and room type, respectively. The sales people and consumers may select one of a plurality of links 44, 46 to view a furniture item menu associated with the selected link 44, 46. In the particular embodiment shown in FIG. 5, each of the room type links 46 include a corresponding thumbnail image 47 illustrating an exemplary furniture item that may be included in a furniture item menu associated with the particular link 46.

Figure 6:
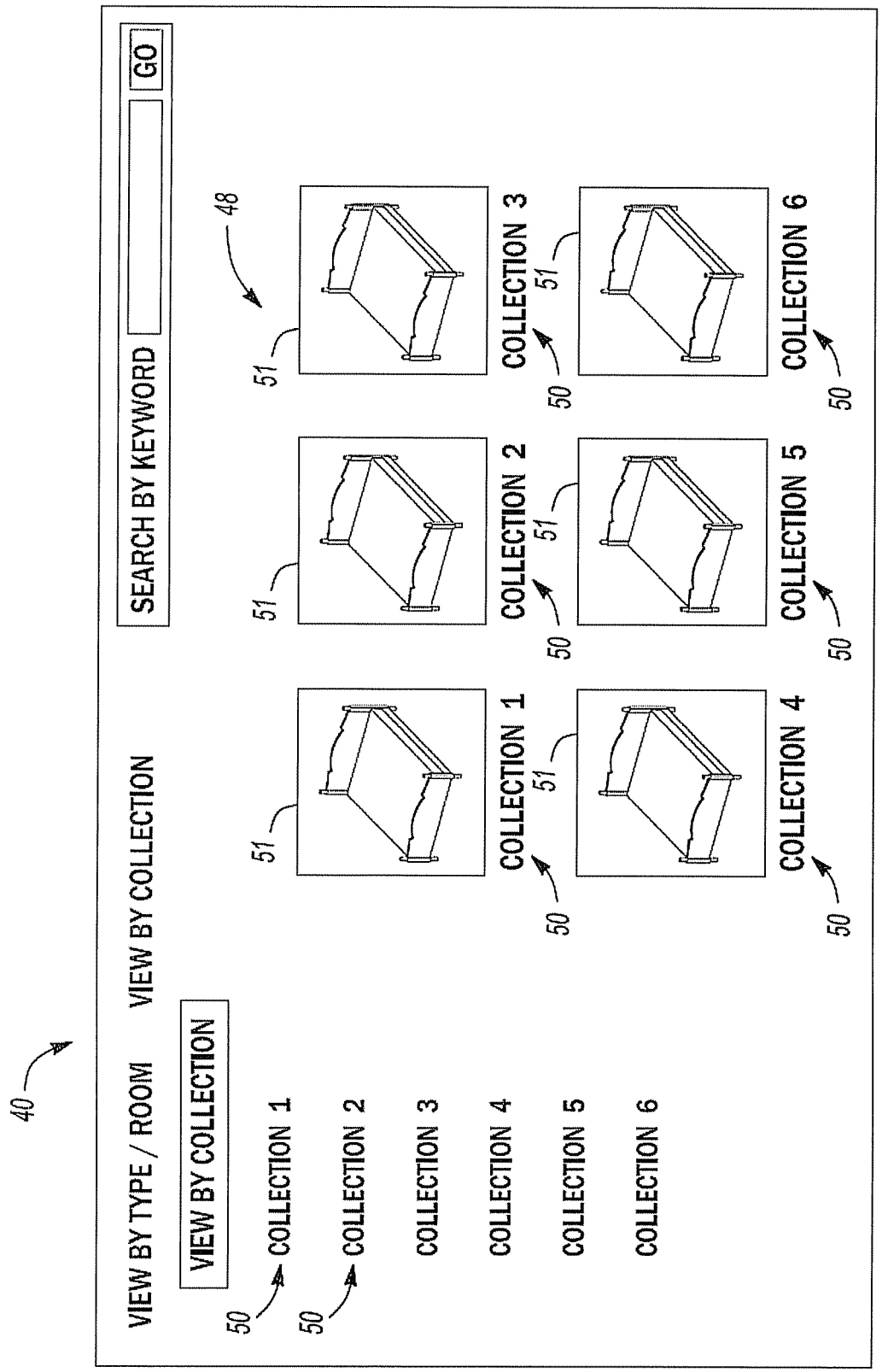
FIG. 6 is a schematic representation of the retail floor catalog having a furniture collection menu according to the principles of the present disclosure.

Additionally or alternatively, the retail floor catalog 40 may include a furniture collection menu 48 (FIG. 6). The salesperson or consumer may choose to search for furniture items using the furniture type/room type menu 42 or the furniture collection menu 48. The furniture collection menu 48 may include a plurality of collection links 50 and thumbnail images 51, allowing sales people and consumers to search for furniture items by furniture collection. The sales people and consumers may select one of the collection links 50 to view a furniture item menu 52 (FIG. 7) associated with the selected furniture collection.

Figure 7:
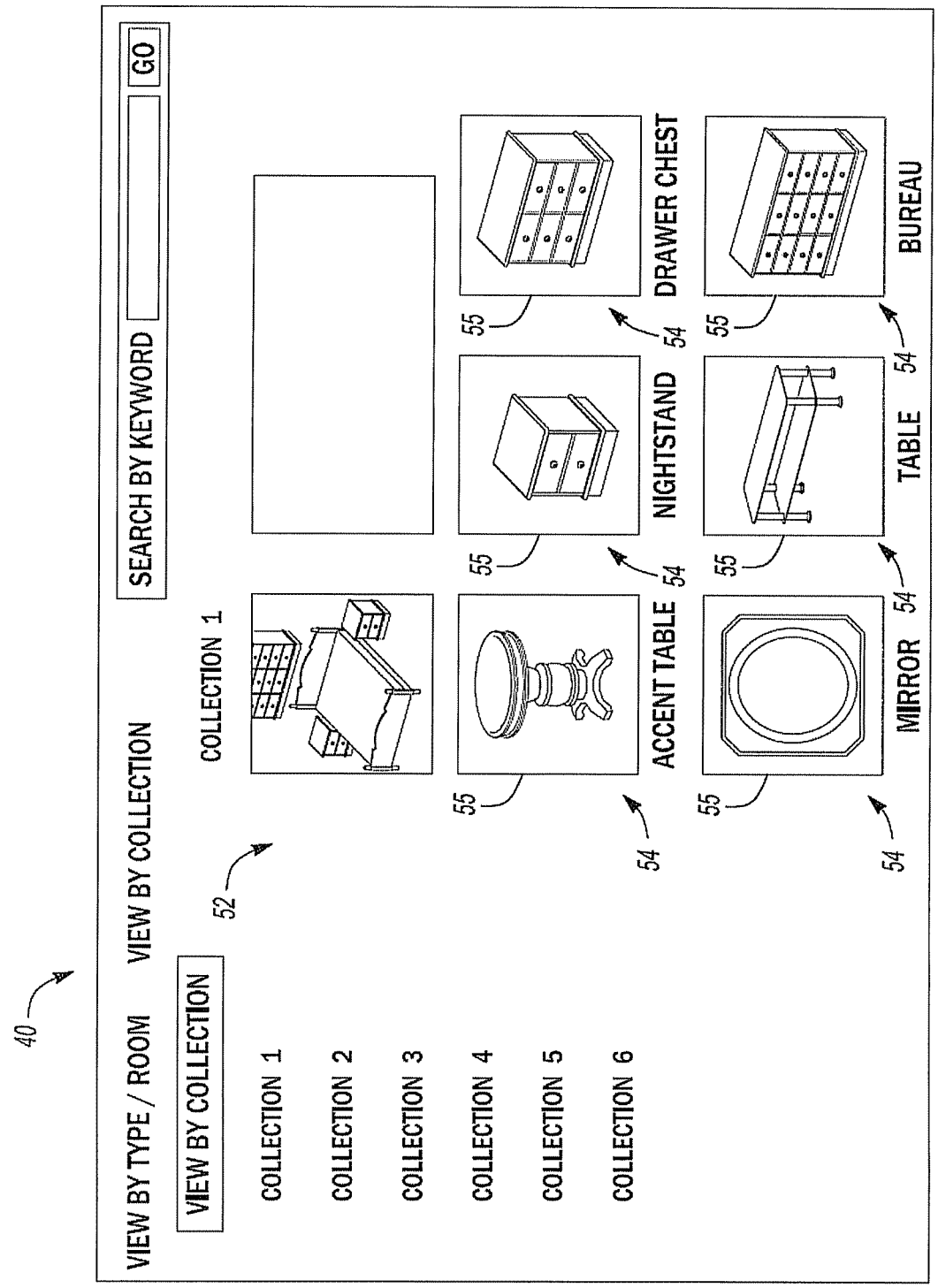
FIG. 7 is a schematic representation of the retail floor catalog displaying a furniture item menu according to the principles of the present disclosure.

As shown in FIG. 7, an exemplary furniture item menu 52 may include a plurality of furniture item links 54 and thumbnail images 55 whereby each link 54 and thumbnail image 55 correspond to a particular furniture item. The plurality of furniture items displayed on the furniture item menu 52 may comprise the furniture collection selected from the furniture collection menu 48 (FIG. 6). The sales people and consumers may select one of the furniture item links 54 to view an item display page 60 (FIG. 8).

Figure 8:
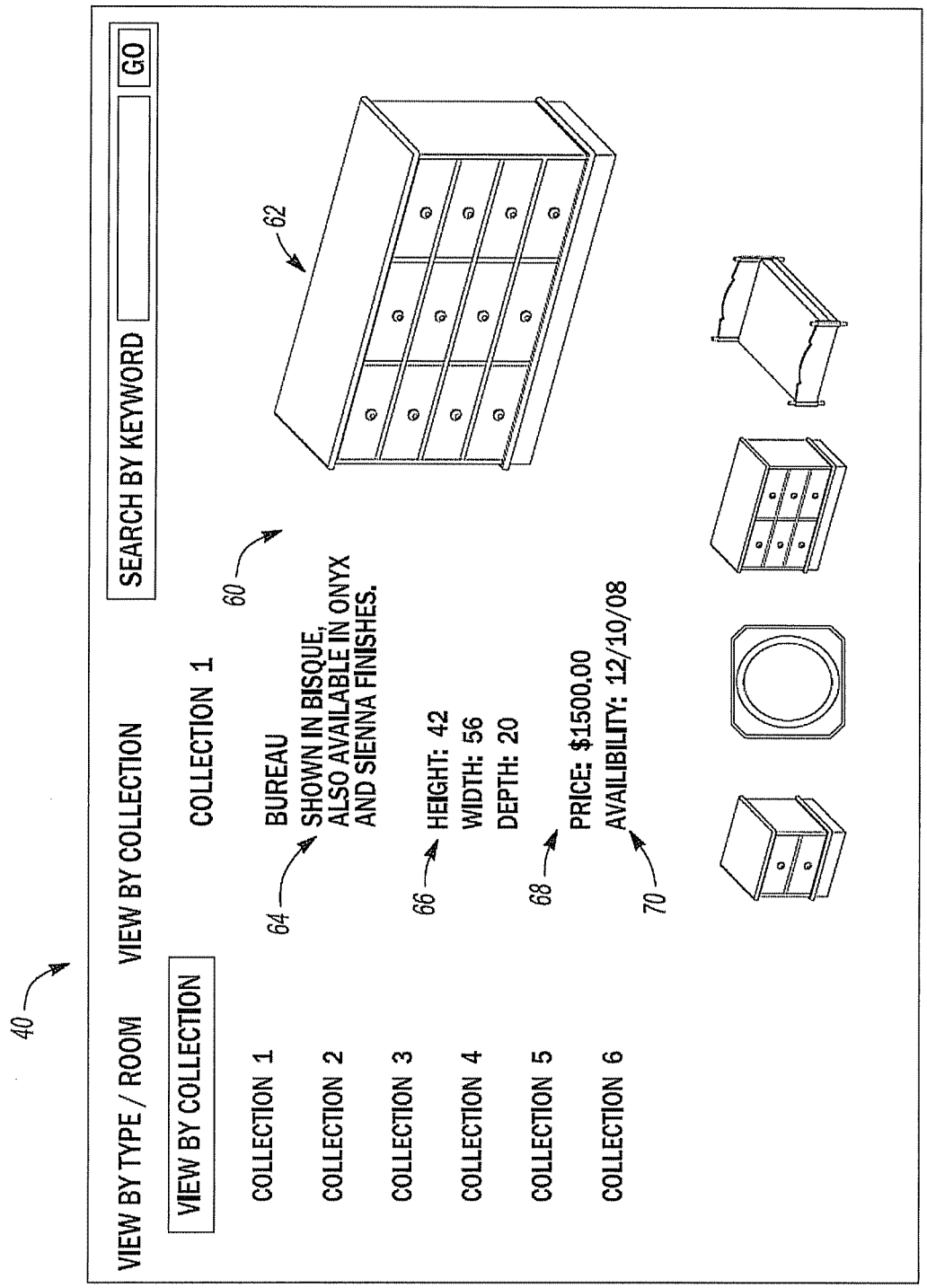
FIG. 8 is a schematic representation of an item display page of the retail floor catalog according to the principles of the present disclosure.

As shown in FIG. 8, the item display page 60 may include a photograph 62 illustrating the selected furniture item, a product description 64, physical dimensions 66, a retail price 68 and an availability date 70. The product description 64 may include available colors and/or finishes from which the consumer may choose. Although not specifically shown, the item display page 60 could include further descriptions of the furniture item, including, for example, descriptions of functional and/or aesthetic features of the item, types of materials used to construct the furniture item, warranty information and/or other relevant information that may be of interest to consumers. The retail price 68 may include the manufacturer price and the retail margin value (input via the retailer input device 14). The item display page 60 may be generated by the product information system 12 (FIG. 1) and may be updated in real-time to display any changes in the retail margin value and/or availability status.

With reference to FIGS. 1-9, operation of the system 10 will be described. As described above, an authorized manager of the furniture retailer may set and modify the retail margin values of furniture items by typing retail margin values into the input fields 32 of the sales tool 28. The manager may then select the apply button 34 to communicate the retail margin values to the retail margin data store 20 via the Internet or extranet connection.

The salesperson may be required to enter a username and password into the retail floor display device 16 to access the retail floor catalog 40. The username and password may be associated with the retailer identifier stored in the retail margin data store 20 corresponding to the particular furniture retailer. Entering the username and password may cause the product information provider 18 to retrieve the retailer identifier. To view the item display page 60 of a particular furniture item, the salesperson or consumer may navigate through the retail floor catalog 40 via the retail floor display device 16, as described above. The item display page 60 may be generated by the product information system 12 according to the flowchart illustrated in FIG. 9.

Selecting the furniture item link 54 from the furniture item menu 52 may send a product identifier signal to the product information system 12. The product identifier may correspond to the particular furniture item selected from the furniture item menu 52. Upon receiving the product identifier at step 110, the product information provider 18 may retrieve the manufacturer price and other product information, at step 120, from the manufacturer pricing data store 22 and the product description data store 24, respectively. At step 130, the product information provider 18 may retrieve the retail margin value of the furniture collection under which the selected furniture item is categorized. As shown in step 140, the product information provider 18 may also retrieve the retail margin value that was individually applied to the selected furniture item via the sales tool 28 shown in FIG. 4. The retail margin value applied to the furniture collection could be applied, by default, to every furniture item in that collection, unless the manager manually changes the margin value for one or more individual furniture items. The retail margin values retrieved at steps 130 and 140 may be associated with the retailer identifier retrieved in response to the username and password being entered into the retailer display device 16.

At step 150, the product information provider 18 may compare the margin entered for the collection and the margin entered for the furniture item. In the particular embodiment shown in FIG. 9, the product information provider may apply the lower margin value if these margin values are different. Alternatively, the higher margin value could be applied if the item margin value and the collection margin value are different. In yet another embodiment, the system 10 could be configured to always apply the margin value entered for the collection, rather than the margin entered for the furniture item, or vice versa. The system 10 could be configured to allow the authorized manager to choose whether the higher or lower margin value or whether the collection margin or the item margin should be applied by setting a system preference via the retailer input device 14 that may cause the product information provider 18 to apply one of the margin values accordingly. It will be appreciated that the system 10 could employ other means of selecting an applicable margin value among multiple conflicting margin values.

At step 160, the product information provider 18 may retrieve the availability status of the selected furniture item from the manufacturer inventory data store 26. As described above, the availability status may be the earliest date on which the furniture item can be shipped from the manufacturer's plant to the retailer's store or warehouse. Additionally or alternatively, the availability status could include the quantity of the selected furniture item that is currently available or the quantity that will be available at a future date.

At step 170, the product information provider 18 may generate the item display page 60. Generating the item display page 60 may include determining the retail price 68 and communicating the retail price 68 and item availability status 70 to the retail floor display device 16 for subsequent display on the item display page 60. The product information provider 18 may calculate the retail price 68 using the following equation, where $P_R$ is the retail price 68, $P_M$ is the manufacturer price and M is the retail margin value expressed as a percentage: $P_R = P_M/(100\%-M)$.

Figure 9:
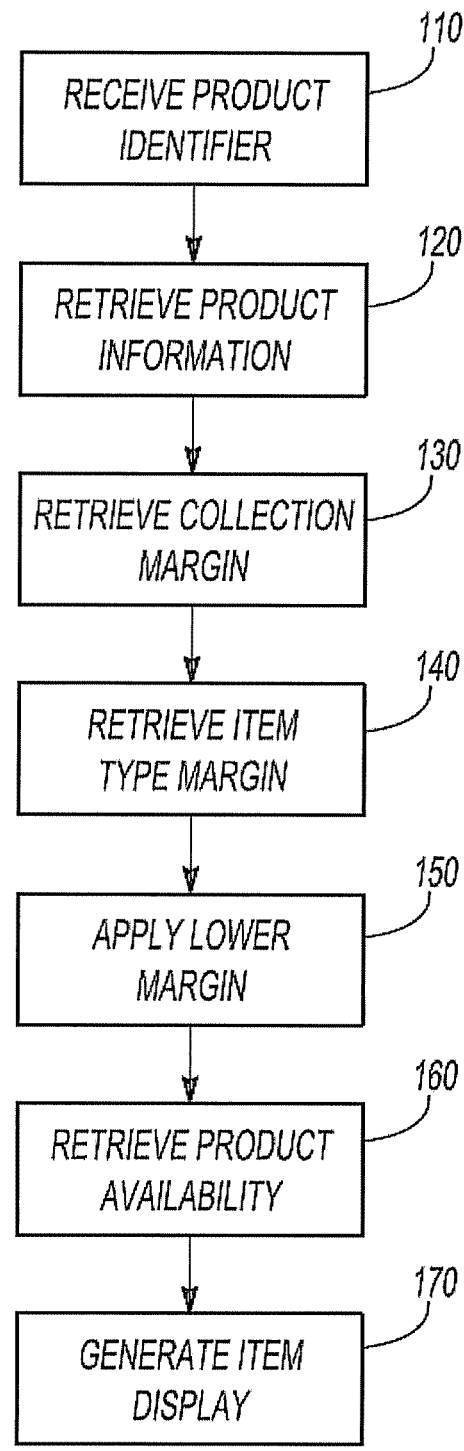
FIG. 9 is a flowchart illustrating the operation of the system of FIG. 1 according to an embodiment of the present disclosure.

It is to be understood that only the relevant steps of the methodology are discussed in relation to FIG. 9, but that other software-implemented instructions may be needed to control and manage the overall operation of the system.

Although the system 10 is described as receiving a margin value and determining a retail price based thereon, the system 10 could additionally or alternatively receive any retail markup value or factor including, for example, a sales, general and administration (SG&A) markup, a tax markup, sales commission markup, or any combination thereof. Further, although the exemplary embodiments of the system 10 are described above with reference to a furniture manufacturer and furniture retailers, it will be appreciated that the system 10 may be applicable to any retail and/or consumer product industry that may include relationships between or among manufacturers, retailers, dealers and/or distributors.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A sales management system comprising:
a manufacturer pricing data store operable to store a manufacturer price for a sales item as provided by a manufacturer of the sales item;
a plurality of retail input devices each adapted to receive a margin applicable to the sales item from a corresponding one of a plurality of retailers and operable to store the margin in association with the corresponding retailer;
a retail display device residing at a retail location associated with at least one of the plurality of retailers and configured to display product information including a retail price for the sales item; and
a product information provider embodied as computer executable instructions on a computer device located remotely from the retail display device and in data communication with the manufacturer pricing data store and the plurality of retail input devices, the product information provider configured to receive a request for product information pertaining to the sales item from the retail display device and operable to compute the retail price for the sales item based in part on the manufacturer price for the sales item and the margin associated with one of the plurality of retailers and to provide the retail price to the retail display device for display in relation to the sales item.

2. The sales management system of claim 1, further comprising a retail margin data store in communication with the product information provider and the retail input devices, the retail margin data store storing a plurality of retailer identifiers and a plurality of margin values associated with a plurality of sales items, each of the plurality of retailer identifiers being associated with a different one of the plurality of retailers.

3. The sales management system of claim 1, further comprising a product description data store in communication with the product information provider and storing at least one of a photograph and a physical description corresponding to the sales item.

4. The sales management system of claim 1, further comprising a manufacturer inventory data store in communication with the product information provider and storing an availability status of the sales item.

5. The sales management system of claim 1, further comprising a web-based sales tool displayed on the retail input devices, the web-based sales tool including a plurality of retail margin input fields, each of the plurality of retail margin input fields corresponding to at least one of a plurality of sales items.

6. The sales management system of claim 1, wherein the retail display device is a computing device operable to generate a retail catalog including retail prices and product information corresponding to a plurality of sales items and one of the plurality of retailers.

7. The sales management system of claim 6, wherein the retail catalog includes the plurality of sales items listed in at least one of a sales item collection menu and a sales item type menu.

8. A sales management system comprising:
a manufacturer pricing data store operable to store manufacturer prices for a plurality of sales items as provided by one or more manufacturers of the sales items;
a plurality of retail input devices each associated with a corresponding one of a plurality of retailers and including a web-based sales tool having a plurality of margin input fields, each of the plurality of margin input fields corresponding to at least one of the plurality of sales items;
a plurality of retail display devices each residing at a corresponding one of a plurality of retail locations and configured to display product information including a retail price for the corresponding retail location for each of the plurality of sales items, each of the plurality of retail locations being associated with a corresponding one of the plurality of retailers; and
a product information provider embodied as computer executable instructions on a computer device and in communication with the plurality of retail display devices, the manufacturer pricing data store, and the plurality of retail input devices,
wherein the product information provider is configured to receive a request for product information pertaining to at least one of the plurality of sales items from the retail display devices and operable to compute the retail price for the at least one of the plurality of sales items based in part on the manufacturer price for the at least one of the plurality of sales items and the margin associated with the corresponding retailer and to provide the retail price to the corresponding retail display device for display in relation to the at least one of the plurality of sales items.

9. The sales management system of claim 8, further comprising a product description data store in communication with the product information provider and storing photographs and physical descriptions corresponding to the plurality of sales items.

10. The sales management system of claim 8, wherein each of the retail display devices include a computing device operable to generate a retail catalog specific to the corresponding retailer, the retail catalog including retail prices and product information corresponding to the plurality of sales items.

11. The sales management system of claim 10, wherein the retail catalog includes the plurality of sales items listed in at least one of a sales item collection menu and a sales item type menu.

12. The sales management system of claim 8, further comprising a manufacturer inventory data store in communication with the product information provider and storing an availability status of at least one of the plurality of sales items.

13. A tangible, non-transitory computer readable medium having computer executable commands for directing a computer to execute a method comprising:
selecting a product identifier associated with a sales item;
retrieving a manufacturer price associated with the sales item;
retrieving a margin associated with the sales item;
determining a sales price associated with the sales item based on the manufacturer price and the margin;
retrieving a current product availability status associated with the sales item, wherein the current product availability status provides an indication as to when the sales item will be available for acceptance by a purchaser; and
generating a display associated with the sales item and including the sales price and the current product availability status.

14. The tangible, non-transitory computer readable medium of claim 13, further comprising receiving at least one of a physical description of the sales item and a photograph of the sales item, wherein the display includes the at least one of the physical description and the photograph.

15. The tangible, non-transitory computer readable medium of claim 13, wherein a second data store receives the margin from a remote retail input device.

16. The tangible, non-transitory computer readable medium of claim 15, wherein the margin associated with the sales item is updated from the remote retail input device.

17. The tangible, non-transitory computer readable medium of claim 16, wherein the method further comprises:
determining an updated sales price associated with the sales item based on an updated margin; and
generating an updated display including the updated sales price.

18. The tangible, non-transitory computer readable medium of claim 15, wherein the remote input device includes a web-based sales tool including a plurality of margin input fields, each of the plurality of margin input fields corresponding to at least one of a plurality of sales items.

19. The tangible, non-transitory computer readable medium of claim 18, wherein each of the plurality of margin input fields correspond to at least one of a sales item collection and a sales item type.

20. The tangible, non-transitory computer readable medium of claim 13, further comprising generating a retail catalog including a plurality of product identifiers corresponding to a plurality of sales items.

21. The tangible, non-transitory computer readable medium of claim 20, wherein the retail catalog includes at least one of a sales item collection menu and a sales item type menu.

22. The tangible, non-transitory computer readable medium of claim 13, wherein the computer is located in a retail showroom and the display is generated in view of a retail customer.

* * * * *